US012637024B2

(12) United States Patent
Fabbrini

(10) Patent No.: US 12,637,024 B2
(45) Date of Patent: May 26, 2026

(54) VEHICLE DRIVE SHAFT GREASE SYSTEM

(71) Applicant: Howard Fabbrini, Midland, MI (US)

(72) Inventor: Howard Fabbrini, Midland, MI (US)

( * ) Notice: Subject to any disclaimer, the term of this patent is extended or adjusted under 35 U.S.C. 154(b) by 0 days.

(21) Appl. No.: 18/882,037

(22) Filed: Sep. 11, 2024

(65) Prior Publication Data

US 2025/0083630 A1 Mar. 13, 2025

Related U.S. Application Data

(60) Provisional application No. 63/581,770, filed on Sep. 11, 2023.

(51) Int. Cl.
 *F16D 3/06* (2006.01)
 *B60R 17/02* (2006.01)
(52) U.S. Cl.
 CPC .......... *B60R 17/02* (2013.01); *F16D 2300/06* (2013.01)
(58) Field of Classification Search
 CPC ........ B60R 17/02; F16D 3/06; F16D 2300/60
 See application file for complete search history.

(56) References Cited

U.S. PATENT DOCUMENTS

| | | | | | |
|---|---|---|---|---|---|
| 1,404,538 | A | * | 1/1922 | Mitchell | F16C 33/1055 384/316 |
| 1,973,702 | A | * | 9/1934 | Cooke | F16D 3/06 464/16 |
| 2,925,885 | A | * | 2/1960 | White | B21B 35/147 184/6 |
| 3,112,970 | A | * | 12/1963 | Burns | H01H 1/60 439/20 |
| 3,242,695 | A | * | 3/1966 | Ross, Jr. | F16D 3/06 184/45.1 |
| 4,176,540 | A | * | 12/1979 | Barber | B21B 35/147 72/236 |
| 5,188,564 | A | * | 2/1993 | Keller | F16N 21/02 464/14 |
| 5,634,530 | A | * | 6/1997 | Maekawa | B60K 17/344 184/6.12 |
| 8,333,665 | B2 | * | 12/2012 | Kohara | C10M 171/004 508/464 |
| 8,556,733 | B2 | * | 10/2013 | Starbatty | B61F 3/04 464/17 |
| 9,410,582 | B2 | * | 8/2016 | Brunazzi | F16D 3/10 |
| 11,879,499 | B2 | * | 1/2024 | Savio | B21B 35/14 |
| 12,117,044 | B2 | * | 10/2024 | Bondioli | F16D 3/841 |
| 12,146,525 | B2 | * | 11/2024 | Bondioli | F16D 3/385 |
| 2001/0007831 | A1 | * | 7/2001 | Edi | F16N 7/36 464/7 |

(Continued)

FOREIGN PATENT DOCUMENTS

| | | | | | |
|---|---|---|---|---|---|
| DE | 102019117643 | A1 | * | 1/2020 | ......... F16C 33/1045 |
| JP | H11148465 | A | * | 6/1999 | |
| JP | 2019190574 | A | * | 10/2019 | |

*Primary Examiner* — Michael A Riegelman

(57) ABSTRACT

A vehicle drive shaft grease system. The vehicle drive shaft grease system comprises a cylindrical housing having a first open end and a second open end. The housing is detachedly affixed to a vehicle support frame by at least one solid tether, and tabs mounted on an outside surface of the cylindrical housing. Grease is distributed to the device and the device distributes the grease through a series of openings and channels to those components requiring the grease.

2 Claims, 7 Drawing Sheets

(56) References Cited

U.S. PATENT DOCUMENTS

| 2010/0027929 A1* | 2/2010 | Kohara | .................. F16D 3/845 |
| | | | 184/102 |
| 2012/0283027 A1* | 11/2012 | Burling | .................... F16N 1/00 |
| | | | 464/7 |
| 2015/0038245 A1* | 2/2015 | Brunazzi | ................. F16D 3/843 |
| | | | 464/172 |
| 2022/0268319 A1* | 8/2022 | Bondioli | ................ F16D 3/841 |
| 2022/0364591 A1* | 11/2022 | Bondioli | ................ F16D 3/841 |
| 2025/0083630 A1* | 3/2025 | Fabbrini | ................ B60R 17/02 |

* cited by examiner

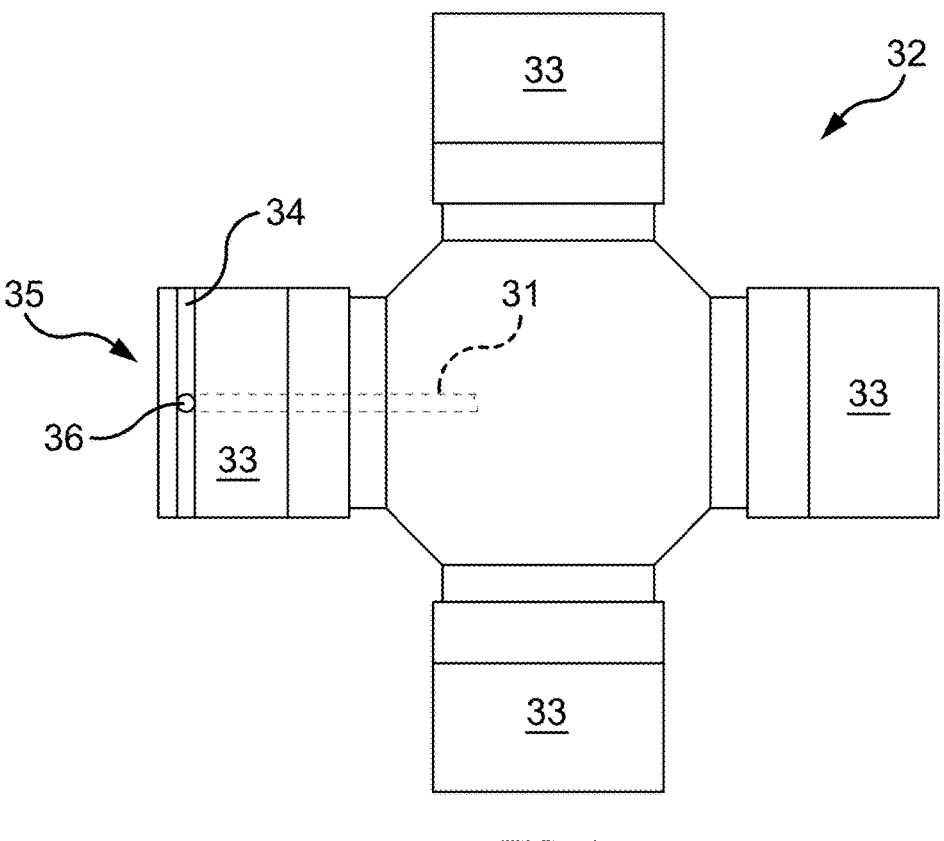
FIG. 4
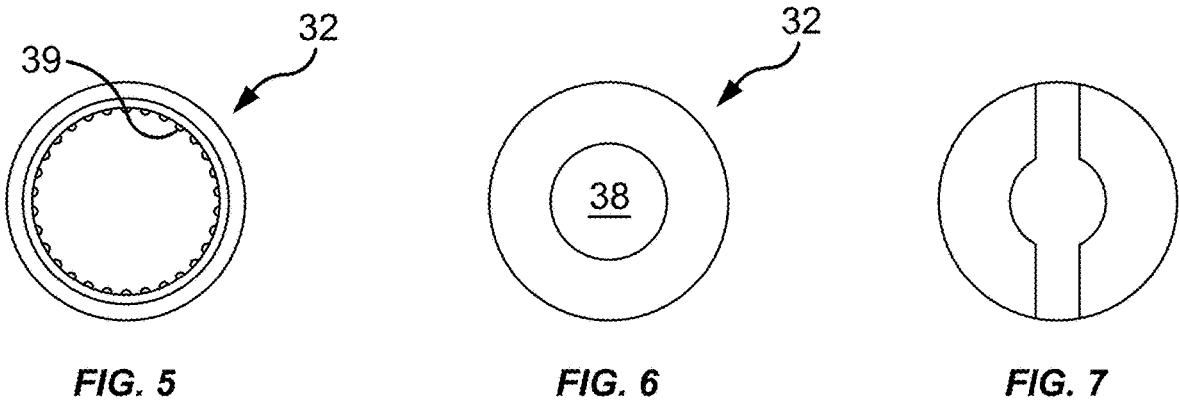
FIG. 5          FIG. 6          FIG. 7

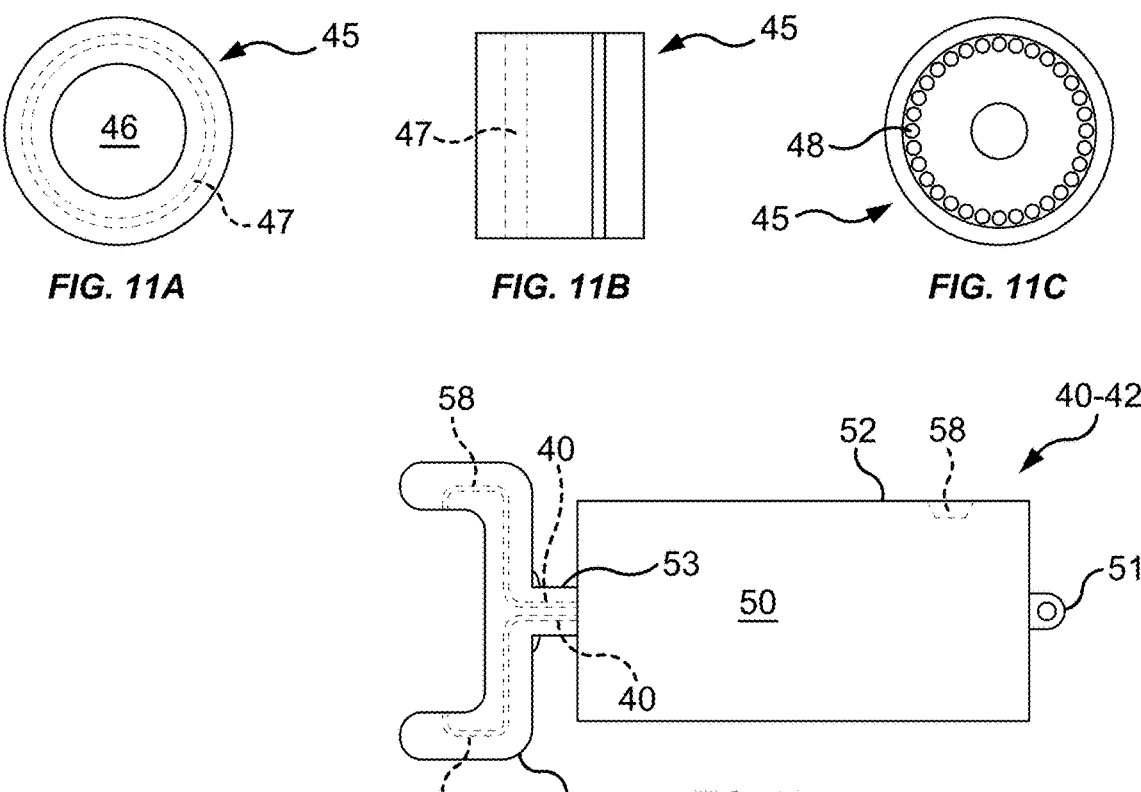
*FIG. 11A*      *FIG. 11B*      *FIG. 11C*
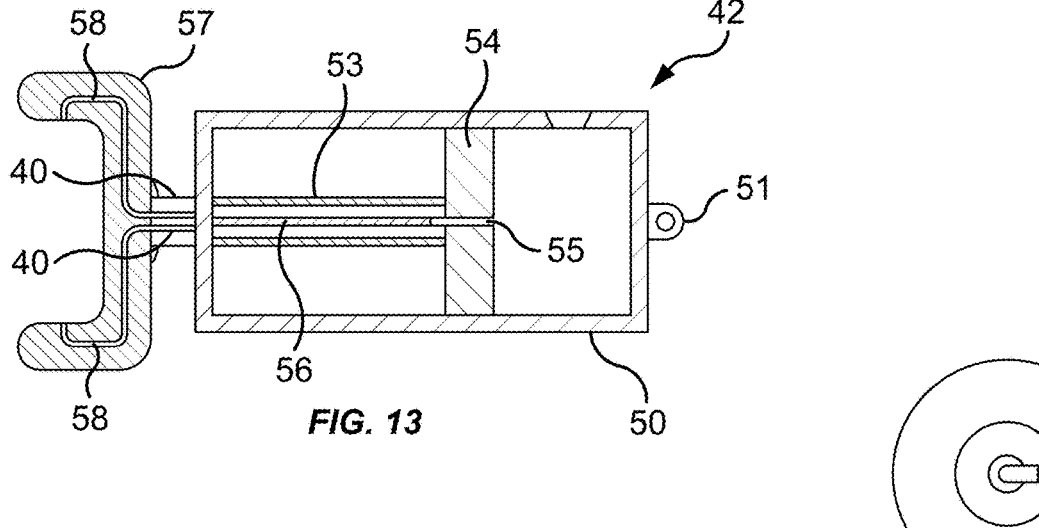
*FIG. 12*
*FIG. 13*
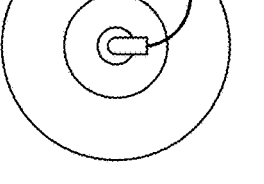
*FIG. 14*
(PRIOR ART)

VEHICLE DRIVE SHAFT GREASE SYSTEM

CROSS-REFERENCE TO RELATED APPLICATIONS

This application claims priority to U.S. provisional application 63/581,770 filed Sep. 11, 2023.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The applicant is not aware of any prior art publications regarding the instant invention.

BRIEF SUMMARY OF THE INVENTION

Thus, what is disclosed and claimed herein is a vehicle drive shaft grease system. The vehicle drive shaft grease system comprises a cylindrical housing having a first open end and second open end. The housing is detachedly affixed to a vehicle support frame by at least one solid tether, and tabs mounted on an outside surface of the cylindrical housing.

The housing contains a first end seal and a second end seal in the ends of the housing. There is a device to permit fixed direction motion between two parts mounted in the first end.

There are five slip rings, each slip ring separated by a seal wherein the slip rings have connected access ports through the housing for a grease supply. The slip rings are a first slip ring, a second slip ring, a third slip ring, a fourth slip ring, and a fifth slip ring.

The first slip ring has an internal opening and channels therein for the passage of grease to the bearing. The second slip ring has an internal opening and channels therein for the passage of grease to a vehicle universal joint to which said vehicle drive shaft grease system is attached.

The third slip ring has an internal opening and channels therein for the passage of grease to the end seal. The fourth slip ring has an internal opening and channels therein for the passage of grease to the second end slip ring, and the fifth slip ring has an internal opening and channels therein for the passage of grease to a second vehicle universal joint to which said vehicle drive shaft grease system is attached.

In another embodiment, there is a dual cylindrical housing arrangement in which an identical cylindrical housing is located on the opposite end of the assembly of a first universal joint to accommodate a second universal joint located on the opposite end from first universal joint.

In a third embodiment, there is a novel cap for a universal joint in which there is no grease zerk. Thus, there is a universal joint end cap the end cap having a solid front end and an endless circumferential channel on an internal wall.

In a further embodiment, there is a sliding high pressure coupler assembly for transporting lubricant. The sliding high pressure coupler assembly comprises a cylindrical housing, wherein the cylindrical housing has a first end and a second end. The first end has an attachment element rigidly attached to it and the housing has a lubricant entry port through a side wall near the first end.

For purposes of this invention "high pressure" means up to 2,000 psi.

The housing has a sliding piston located in the interior wherein the sliding piston has a far end and a near end. There is an elongated rod attached centrally to the near end, the rod extending from the far end through a center opening in the second end of the housing. The piston and rod have an aligned channel through them.

In yet another embodiment of this invention there is a sliding high pressure coupler assembly for transporting lubricant. The device is a means of supplying lubricant from a housing of this invention to a yoke of a universal joint.

BRIEF DESCRIPTION OF THE SEVERAL VIEWS OF THE DRAWING(S)

FIG. 4 is a full top view of a universal joint of a vehicle drive shaft.

FIG. 5 is a full inside view of one end cap of the universal joint of FIG. 4.

FIG. 6 is a full end view of the end cap of FIG. 5.

FIG. 7 is a full end view of the universal joint of FIG. 4 without the end cap.

FIG. 11A is a full top view of a universal joint cap.

FIG. 11B is a full side view of a universal joint cap.

FIG. 11C is a full bottom view of a universal joint cap.

FIG. 12 is a full side view of a sliding high pressure coupler assembly of this invention.

FIG. 13 is a cross-sectional view of the device of FIG. 12 through line A-A.

FIG. 14 is a full top view of a prior art conventional universal joint cap with a prior art grease zerk located therein.

DETAILED DESCRIPTION OF THE INVENTION

Figure 1:
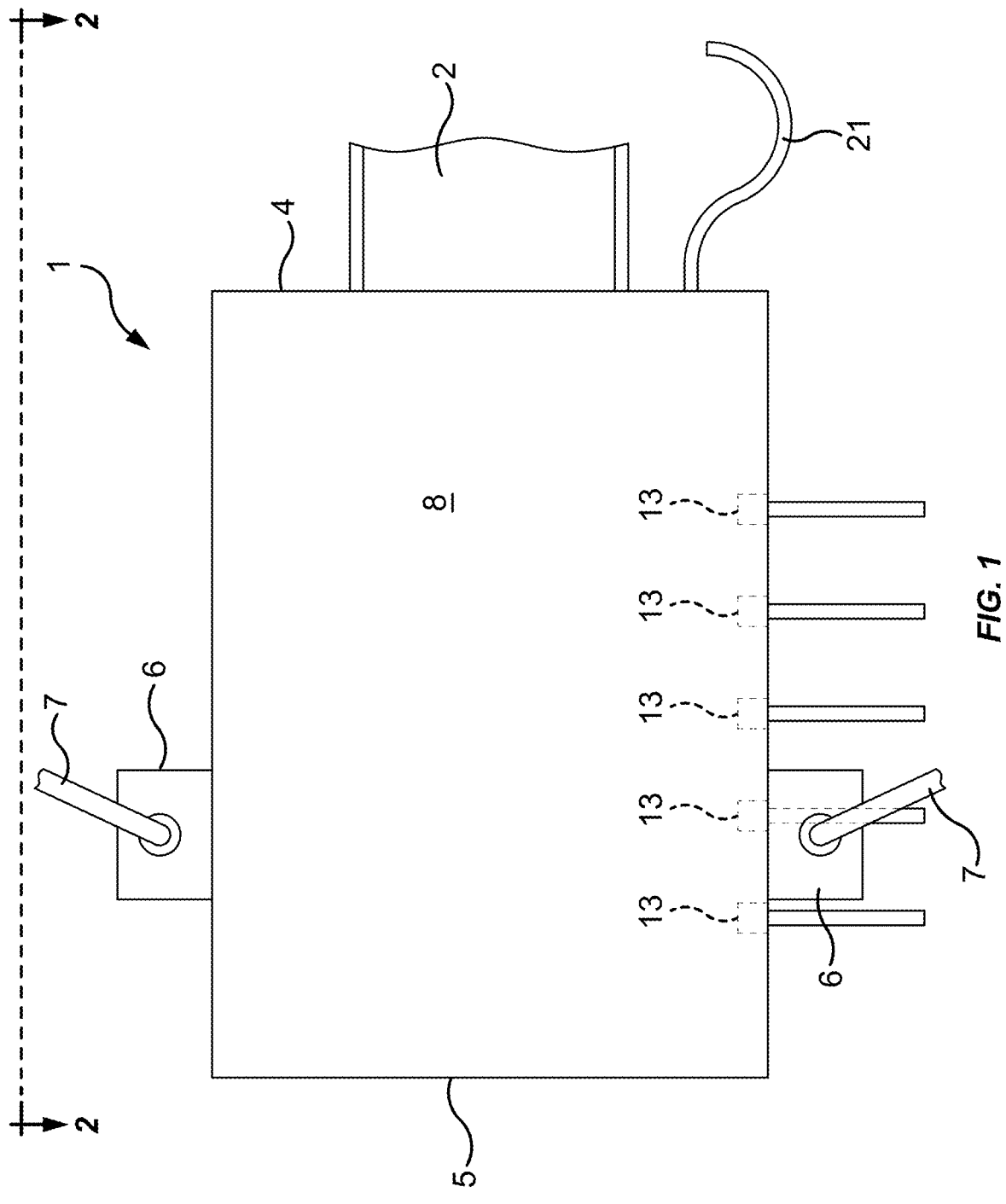
FIG. 1 is a full side view of a device of this invention.

Turning now to FIG. 1, there is shown a full side view of a device 1 of this invention. The device 1 of this invention is a vehicle drive shaft grease system that is configured to be used with a drive shaft in a vehicle, for example, a truck, preferably a large truck such as a logging truck or gravel hauling truck.

The device 1 is intended to supply grease to the device 1 as well as to the universal joints and the internal components of the housing 8. The device 1 is configured such that it has a housing 8 that will surround a lubricant carrier 3 (See FIG. 2). (The drive shaft is not considered part of the invention). There is a first end 4 and a second end 5 and the device 1 is attached to a vehicle, preferably to support frame of vehicle using tabs 6 and tethers 7. The tethers 7 are superior when they are manufactured from metal. Preferred for this invention are hydraulic tethers.

Figure 2:
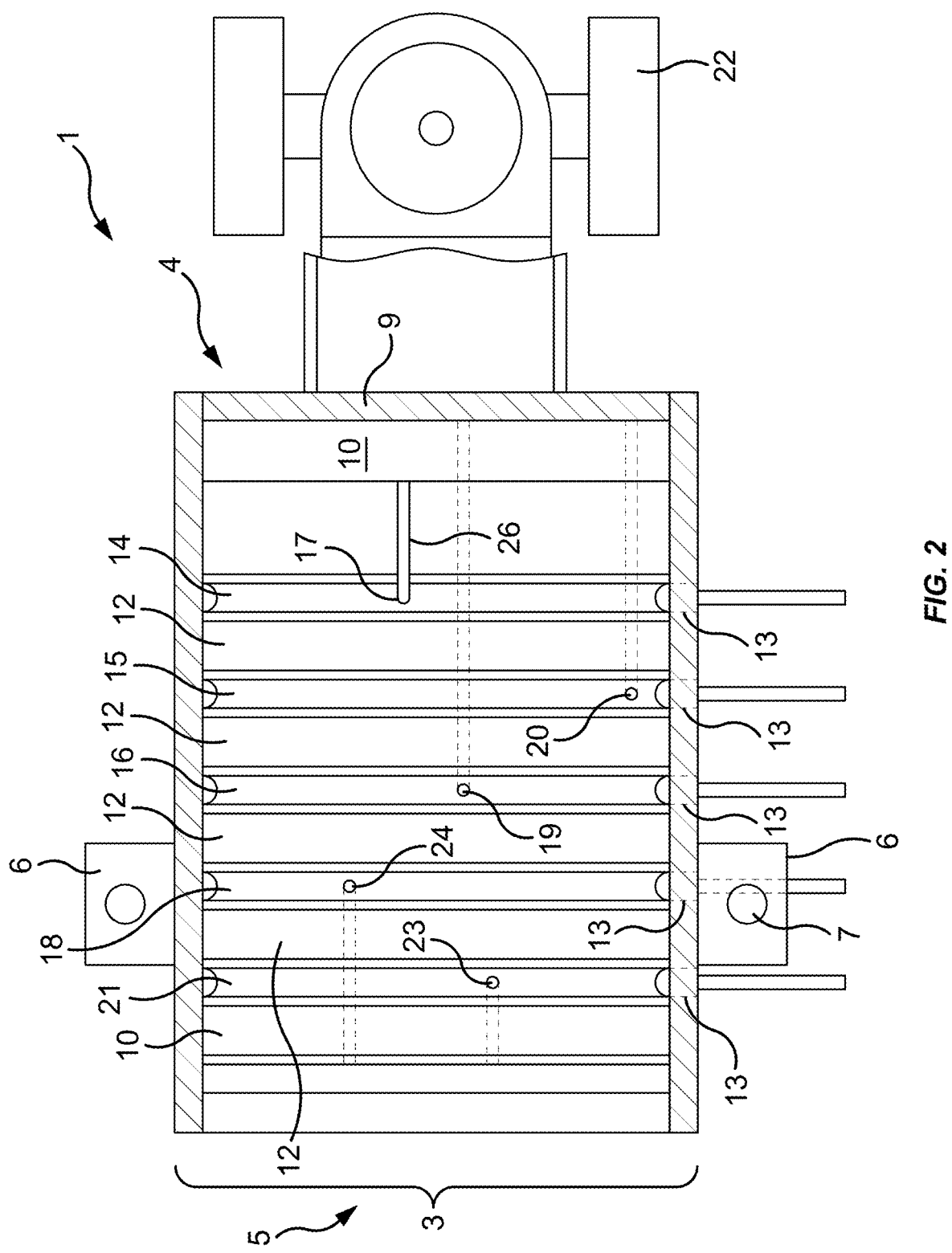
FIG. 2 is a full cross sectional side view of the device of FIG. 1 through line A-A.

Turning to FIG. 2, there is shown seals 9 at the end of the housing 8. In each end 4 and 5, there is a device 10 to permit fixed direction motion between two parts. (Bearings or bushings) These devices 10 can be selected from ball bearings, roller bearings and bushings.

Figure 3:
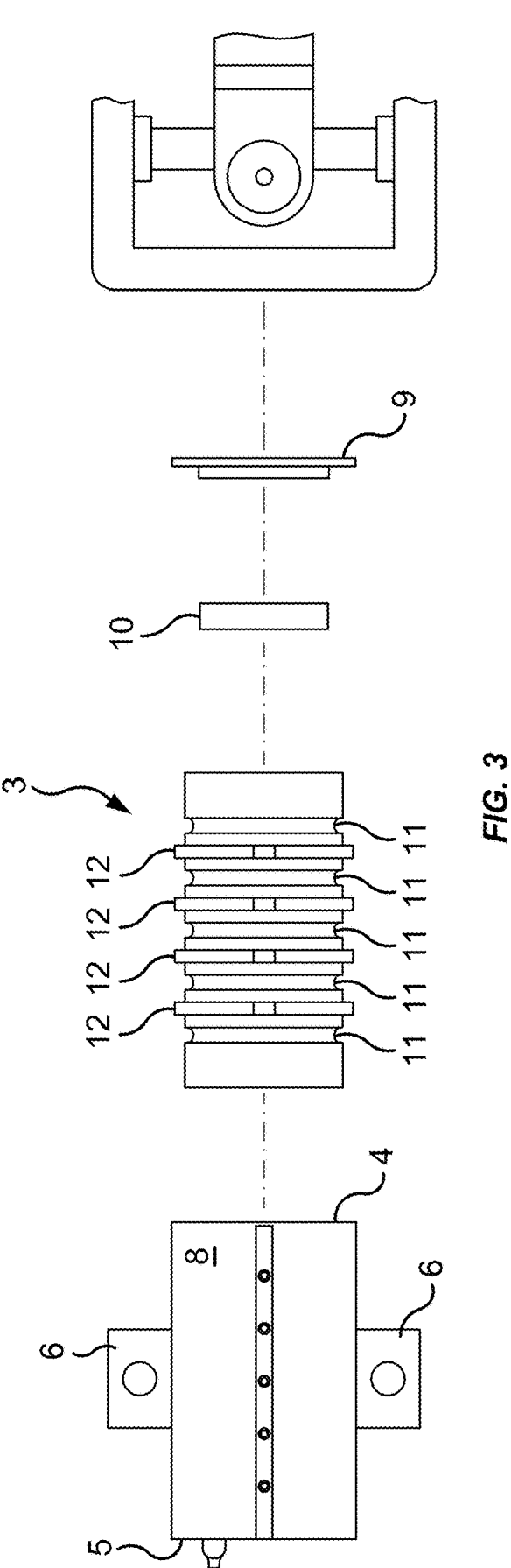
FIG. 3 is an exploded side view of a device of this invention.

FIG. 3 shows an exploded view of the device of this invention wherein the universal joint shown is not part of the device or the invention. There is shown the housing 8, the tabs 6, the lubricant carrier 3, the slip rings, the bearing 10, the seal 9 wherein it is understood that the lubricant carrier 3 inserts into the housing 8 and the bearing and seal are then placed in the end of the housing 8.

Inside the housing 8 and located around the drive shaft are five slip rings 14, 15, 16, 18, and 21, each slip ring is separated by a seal 12. The slip rings have connected access ports 13 through the housing 8 for grease supply. The slip rings include a first slip ring 14, a second slip ring 15 and a third slip ring 16, a fourth slip ring 18, and a fifth slip ring 21.

Figures 8, 9:
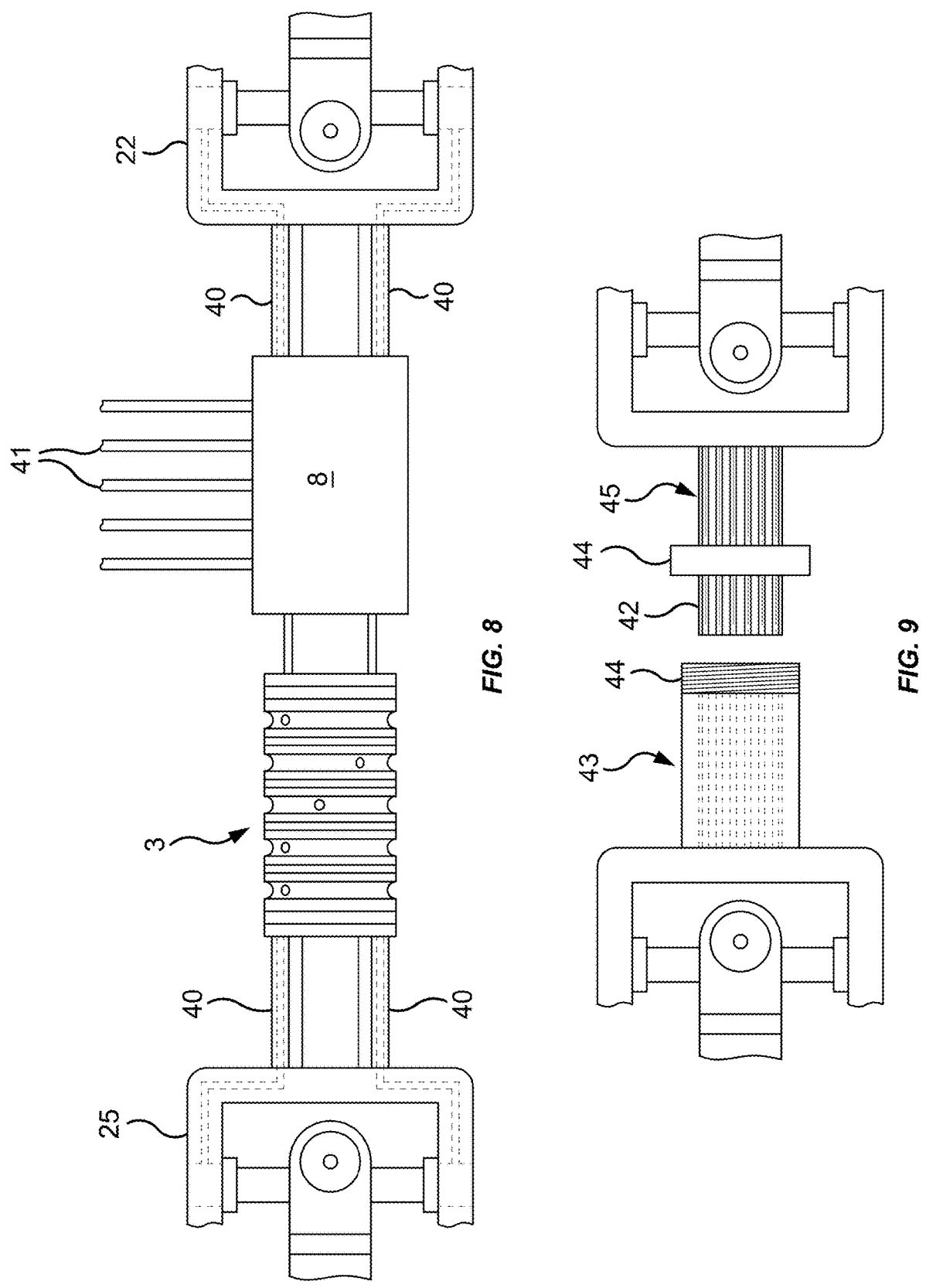
FIG. 8 is an entire drive shaft system showing the device of this invention in an exploded form.
FIG. 9 is an exploded view of the splined coupling arrangement.
Figure 10:
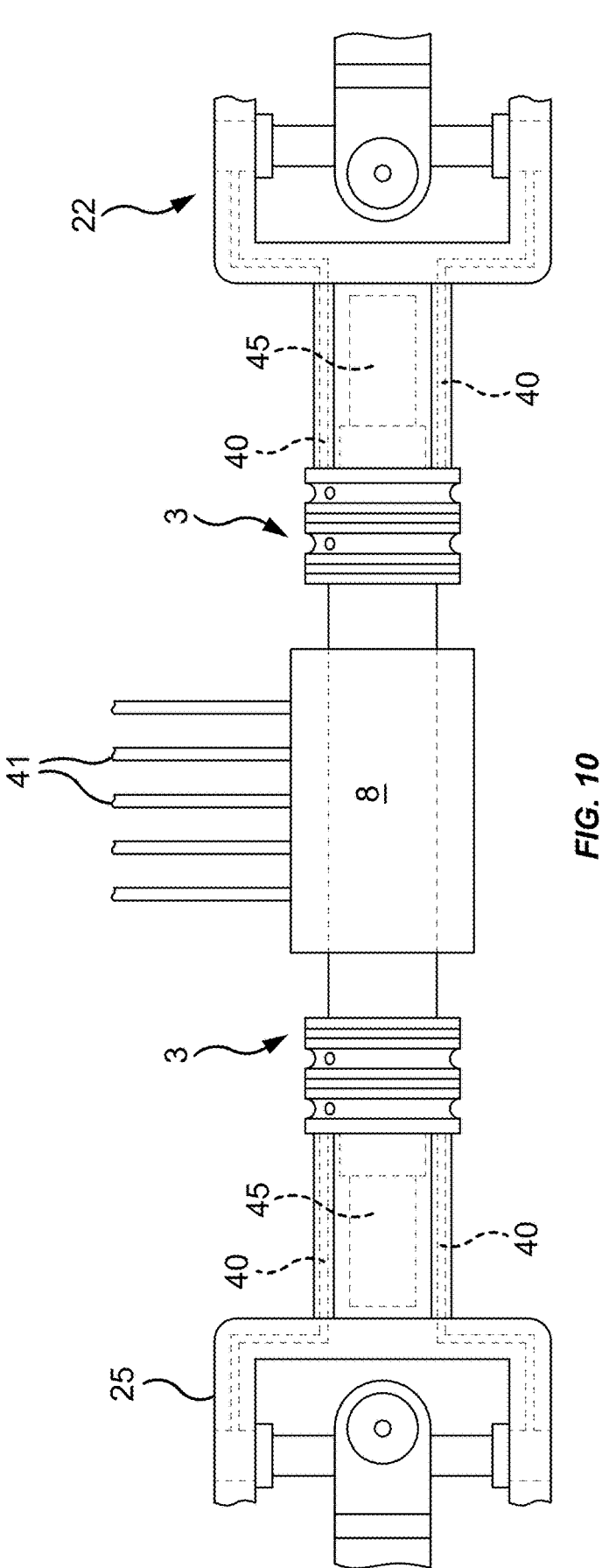
FIG. 10 is a dual assembly of a device of this invention having universal joints at both ends of the device.

The first slip ring 14 has an internal opening 17 and channels 26 in it for the passing of grease to the bearing 18 (see also FIG. 8). The second slip ring 15 has an internal opening 20 and channels 27 in it for the passage of grease to a vehicle universal joint 22 to which the vehicle drive shaft grease system is attached. The third slip ring 16 has an internal opening 19 and channels 38 in it for the passage of grease to the end seal, and the fourth slip ring has an internal opening 24 and channels 29 in it for the passage of grease to the second end seal, and the fifth slip ring has an internal opening 23 and channels 30 in it for the passage of grease to the alternate universal joint 25.

Turning now to FIG. 4, there is shown a modified universal joint 32 that is used in the inventive device 1 of this invention. This joint 32 contains four caps 33, one of which is modified by placing a shallow channel 34 near the outer end 35, with an opening 36 and a channel 37 for grease to have passages from the opening to the internal part of the joint. FIG. 6 shows the modified end cap front end showing the cap 38 for the end. The modified cap is also shown in FIG. 5, in which the roller bearings 39 are shown on the internal surface of the cap.

Turning now to FIG. 8, there is shown a full arrangement of the device 1 of this invention, the universal joints at each end thereof, and the pressure coupler 40. FIG. 8 is shown in a modified exploded view. There are shown both universal joints, the housing 8 of the lubricant carrier 3, the pressure coupler 40 and the grease input lines 41 of the housing 8.

FIG. 9 deals with the drive shaft 45 used in this invention. Female spline 42 of the drive shaft 45 freely inserts into spline receiver 43. There is a threaded end 44 on the spline receiver 43 and the internally threaded cap 44 screws on and tightens onto the threaded end 44. This allows for horizontal movement of the splined part 42 in the splined receiver 43 while the device 1 is in motion.

Grease is supplied to the lubricant carrier 3, it is then described as detailed in FIG. 13 infra.

In FIG. 12 there is shown the slidable coupler assembly 42 of this invention wherein there is shown a housing 50 which is cylindrical in structure, and an attachment device 51. On a side wall 52 there is shown an import opening 58 for lubricant. Also shown is a rod 53. As shown in FIG. 13, the rod 53 is attached to a piston 54 and both of the rod 53 and the piston 54 have a centered channel 55 and 56, respectively, that align with each other.

The piston 54 is movable in a left to right, right to left movement. The rod 53 is rigidly attached to a yoke 57 of a universal joint (whole joint not shown). Internally withing the yoke 57 are channels 58 that convey lubricant to the universal end caps (not shown entirely in this Figure). The rod 53 is attached to the universal joint yoke 57 rigidly.

The lubricant moves from the housing 50 into the interior of the housing 50 and moves through the channels 55 and 56 to channels 58 which lubricate the caps of the universal joint.

Turning now to the universal joint cap of this invention, there is shown in FIG. 11A a full top or front view of such a device, showing a full plug 46 in the device and a circumferential channel 34 in phantom. FIG. 11B is a full side view of FIG. 11A and shows the channel 34 in phantom. FIG. 11C is a full bottom of the device of FIG. 11A showing roller bearings 48. FIG. 14 is a conventional universal joint cap of the prior art showing a grease zerk 49.

What is claimed is:

1. A vehicle drive shaft grease system, said vehicle drive shaft grease system comprising:

A) a cylindrical housing having a first open end and a second open end, said housing being detachedly affixed to a vehicle support frame by at least one solid tether and tabs mounted on an outside surface of said cylindrical housing containing:

B) a first end seal and a second end seal in said ends of said housing;

C) a device to permit fixed direction motion between two parts mounted in said first end;

D) five slip rings, each slip ring separated by a seal;

E) said slip rings having connected access ports through said housing for a grease supply, said slip rings being a first slip ring, a second slip ring, a third slip ring, a fourth slip ring, and a fifth slip ring;

F) said first slip ring having an internal opening therein for the passage of grease to said bearing;

G) said second slip ring having an internal opening therein for the passage of grease to a vehicle universal joint to which said vehicle drive shaft grease system is attached;

H) said third slip ring having an internal opening therein for the passage of grease to said end seal;

I) said forth slip ring having an internal opening therein for the passage of grease to said second end slip ring, and said fifth slip ring having an internal opening therein for the passage of grease to a second vehicle universal joint to which said vehicle drive shaft grease system is attached.

2. A vehicle drive shaft grease system as claimed in claim 1 wherein the system has two ends, each end is defined by a universal joint and each said universal joint has a vehicle drive shaft grease system joined thereto.

* * * * *